United States Patent
Qian

(10) Patent No.: US 11,991,445 B2
(45) Date of Patent: May 21, 2024

(54) CAMERA MOBILE DEVICE STABILIZATION USING A HIGH FRAME RATE AUXILIARY IMAGING ELEMENT

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 523 days.

(21) Appl. No.: 17/413,813

(22) PCT Filed: Dec. 13, 2018

(86) PCT No.: PCT/CN2018/120910
§ 371 (c)(1),
(2) Date: Jun. 14, 2021

(87) PCT Pub. No.: WO2020/118624
PCT Pub. Date: Jun. 18, 2020

(65) Prior Publication Data
US 2022/0078347 A1    Mar. 10, 2022

(51) Int. Cl.
*H04N 23/68* (2023.01)
*G03B 17/56* (2021.01)
(Continued)

(52) U.S. Cl.
CPC ....... *H04N 23/6811* (2023.01); *G03B 17/561* (2013.01); *H04N 23/56* (2023.01);
(Continued)

(58) Field of Classification Search
CPC .. H04N 23/56; H04N 23/6811; H04N 23/685; H04N 23/689; H04N 23/6815; H04N 23/695; G03B 17/561
See application file for complete search history.

(56) References Cited

U.S. PATENT DOCUMENTS

| 2013/0135445 | A1 | 5/2013 | Dahi et al. |
| 2015/0206012 | A1* | 7/2015 | Stout ............. G06V 20/40 |
| | | | 382/103 |

(Continued)

FOREIGN PATENT DOCUMENTS

| CN | 102907092 A | 1/2013 |
| CN | 103329548 A | 9/2013 |
| CN | 108605081 A | 9/2018 |

OTHER PUBLICATIONS

International Search Report issued in International Application No. PCT/CN2018/120910 dated Sep. 19, 2019 (4 pages).
(Continued)

*Primary Examiner* — Daniel M Pasiewicz
(74) *Attorney, Agent, or Firm* — Osha Bergman Watanabe & Burton LLP

(57) ABSTRACT

A method to stabilize image capture for a camera device (110). The method includes capturing, at an auxiliary frame rate and using an auxiliary imaging element (112) rigidly coupled with the camera device (110), auxiliary images of a light source (143) attached to an object (142), where the auxiliary frame rate exceeds a camera frame rate of the image capture (1211); detecting each of a plurality of locations of the light source (143) in a corresponding one of the auxiliary images (1212); analyzing the plurality of locations to generate a measure of uncontrolled movement (1213); and adjusting, based at least on the measure of
(Continued)

uncontrolled movement, the camera device (110) during the image capture of the object by the camera device (110) at the camera frame rate (1214).

31 Claims, 15 Drawing Sheets

(51) Int. Cl.
  *H04N 23/56* (2023.01)
  *H04N 23/695* (2023.01)
(52) U.S. Cl.
  CPC ....... *H04N 23/6815* (2023.01); *H04N 23/685* (2023.01); *H04N 23/689* (2023.01); *H04N 23/695* (2023.01)

(56) References Cited

U.S. PATENT DOCUMENTS

2018/0050264 A1* 2/2018 He ............................. G06T 7/73
2021/0297594 A1* 9/2021 Usami .................. H04N 23/685

OTHER PUBLICATIONS

Written Opinion issued in International Application No. PCT/CN2018/120910 dated Sep. 19, 2019 (4 pages).

\* cited by examiner

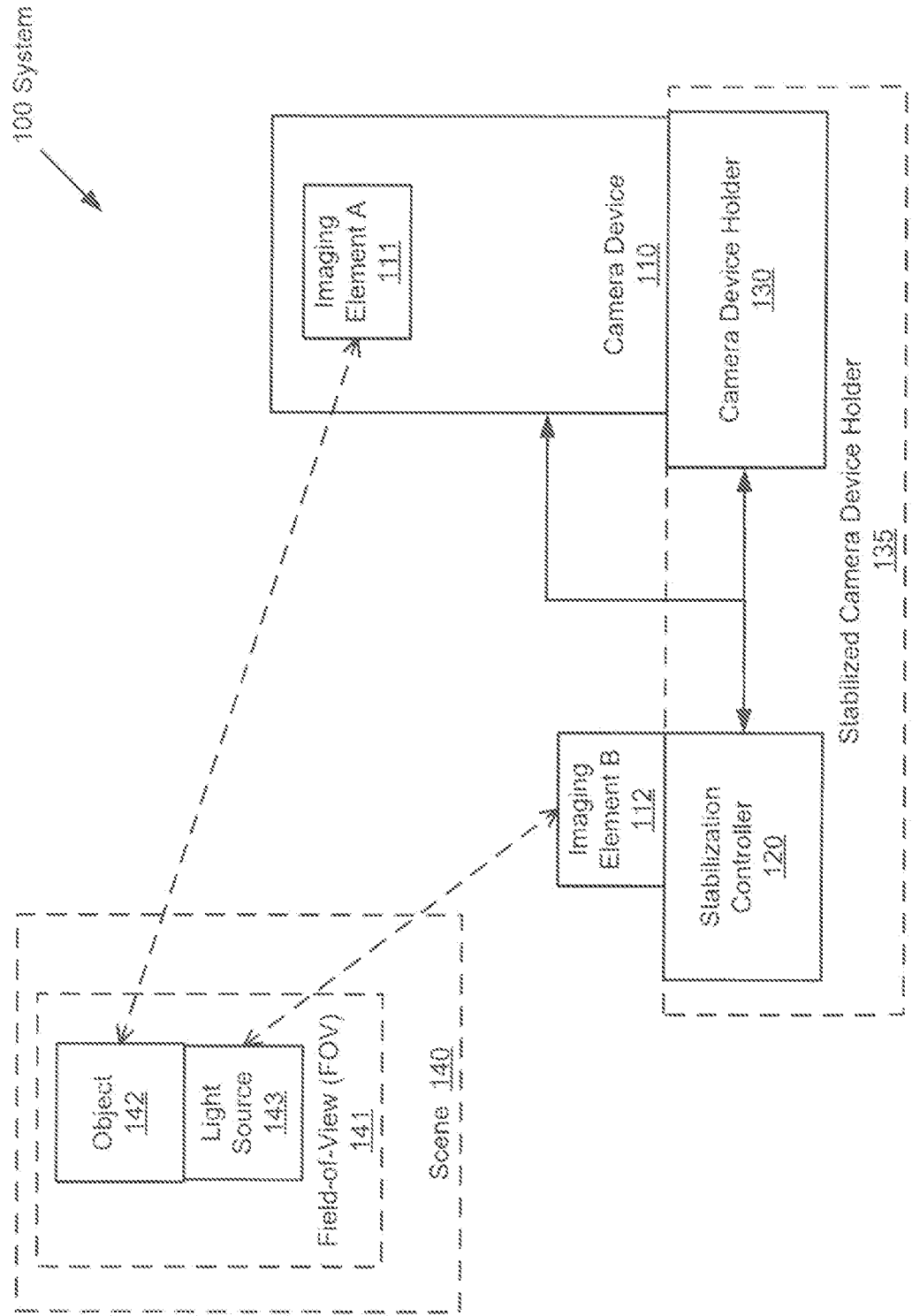
FIG. 1.1

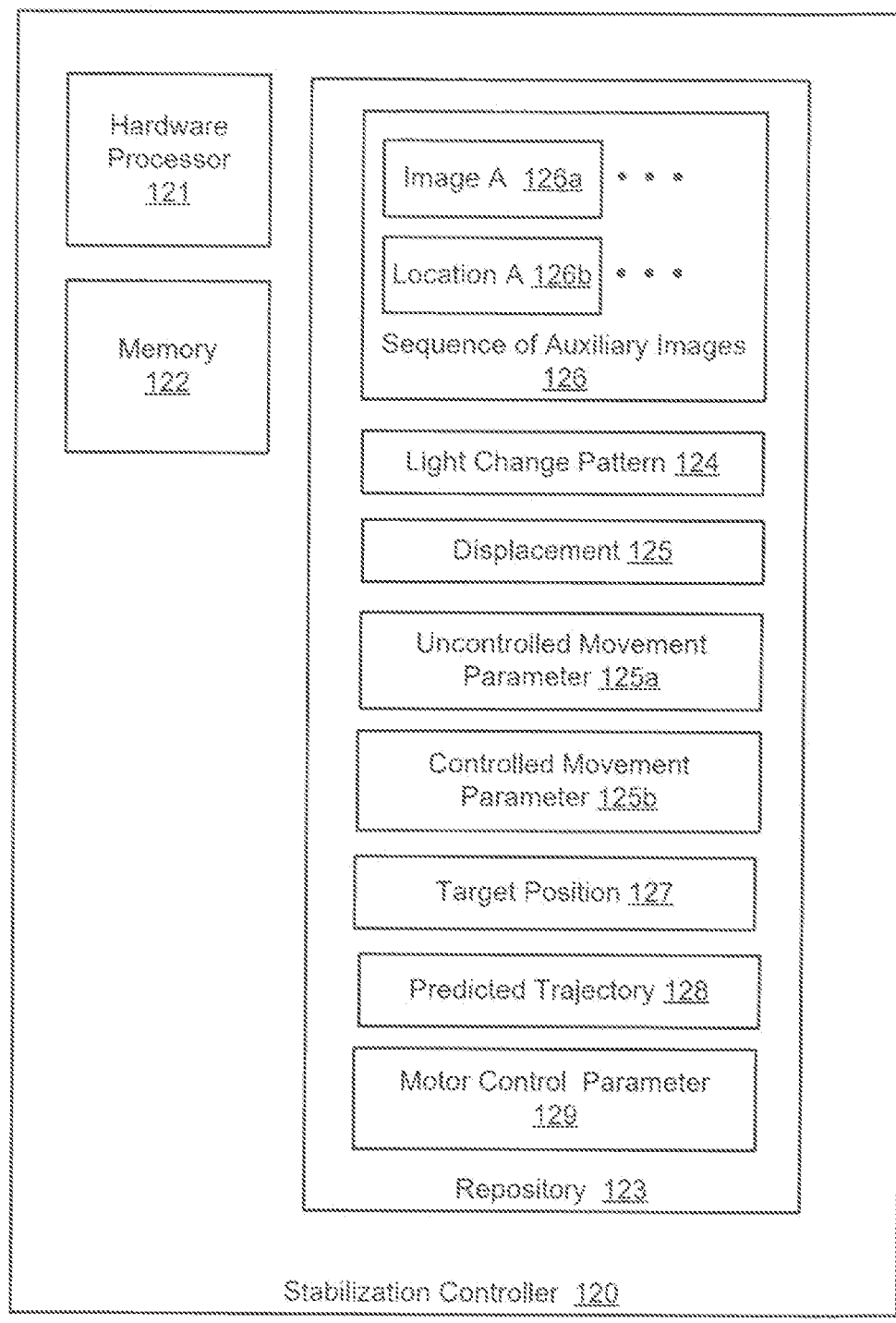
FIG. 1.2

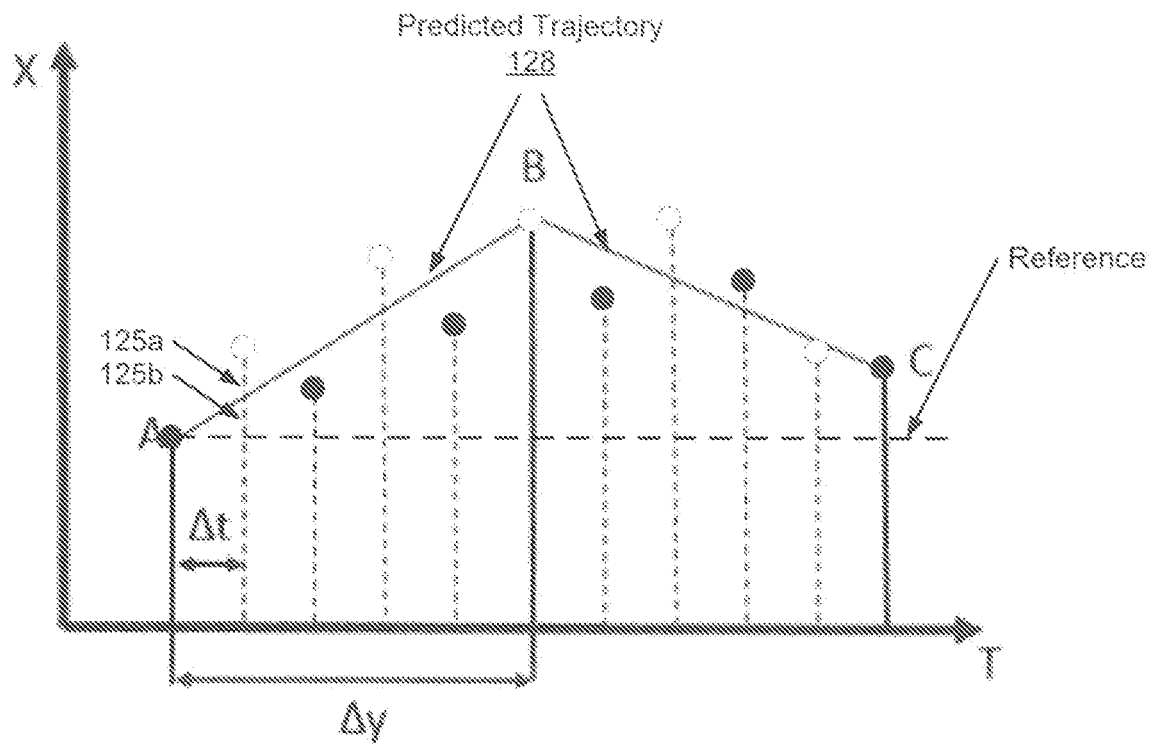
FIG. 1.3

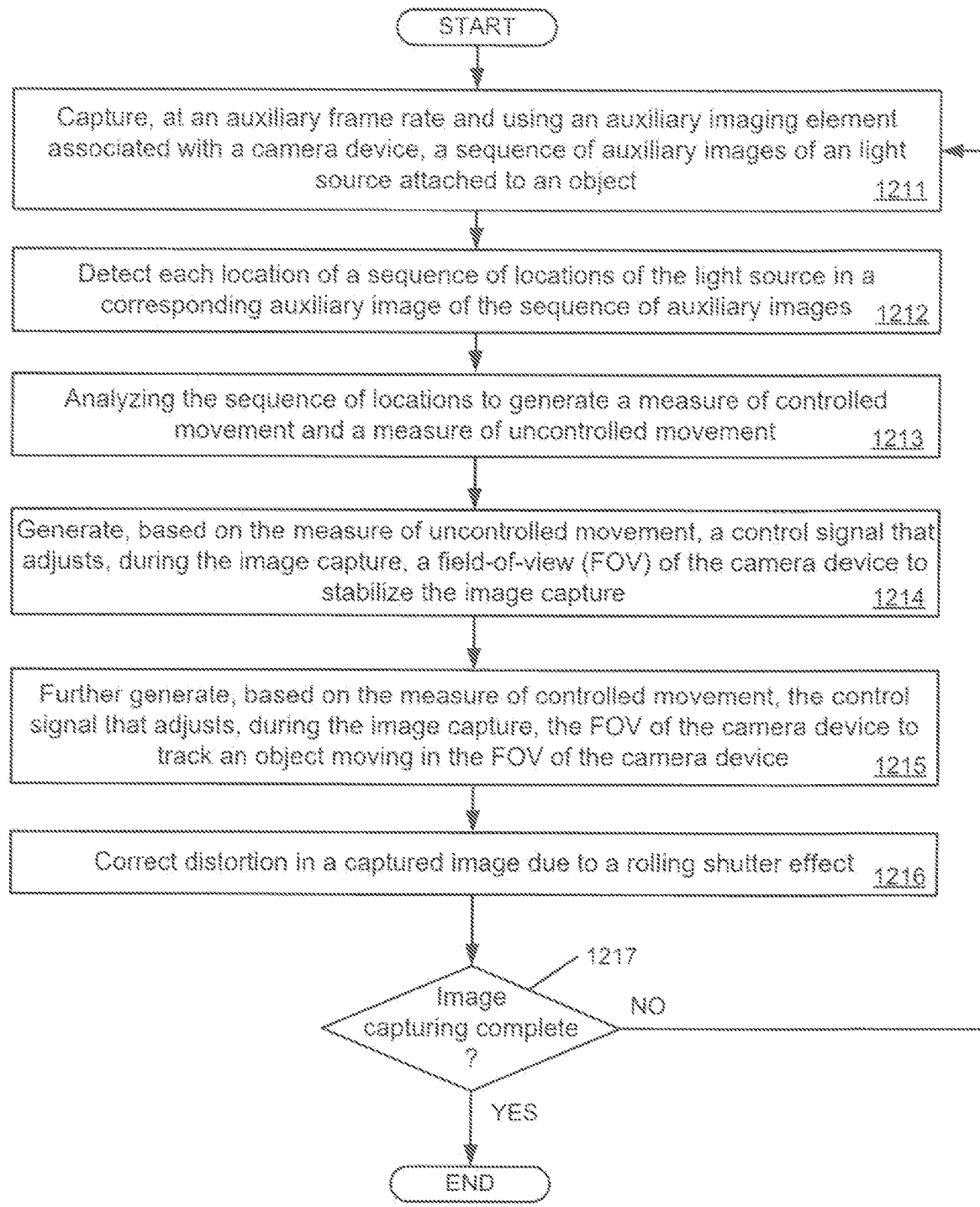
FIG. 2.1

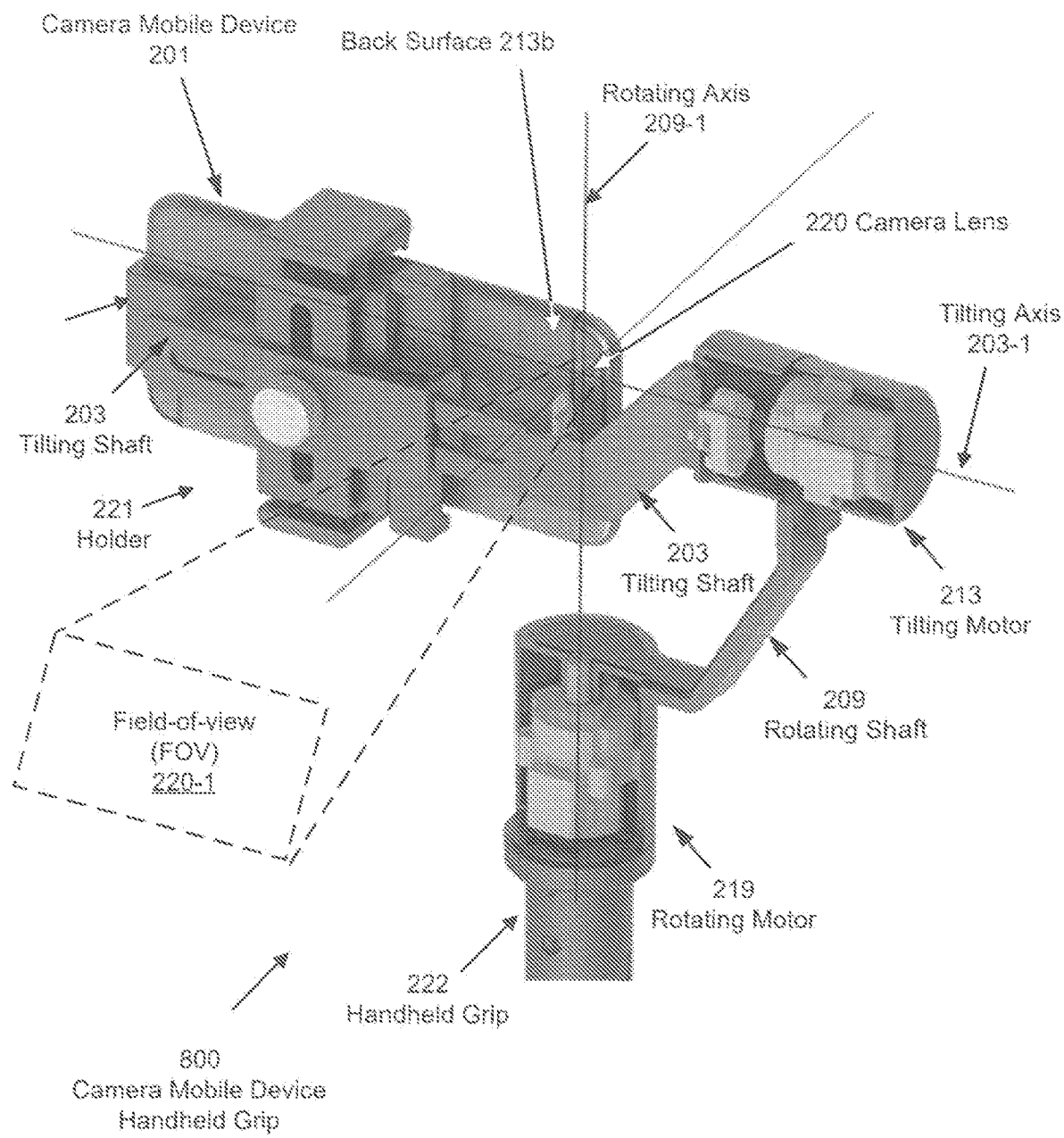
FIG. 3.1

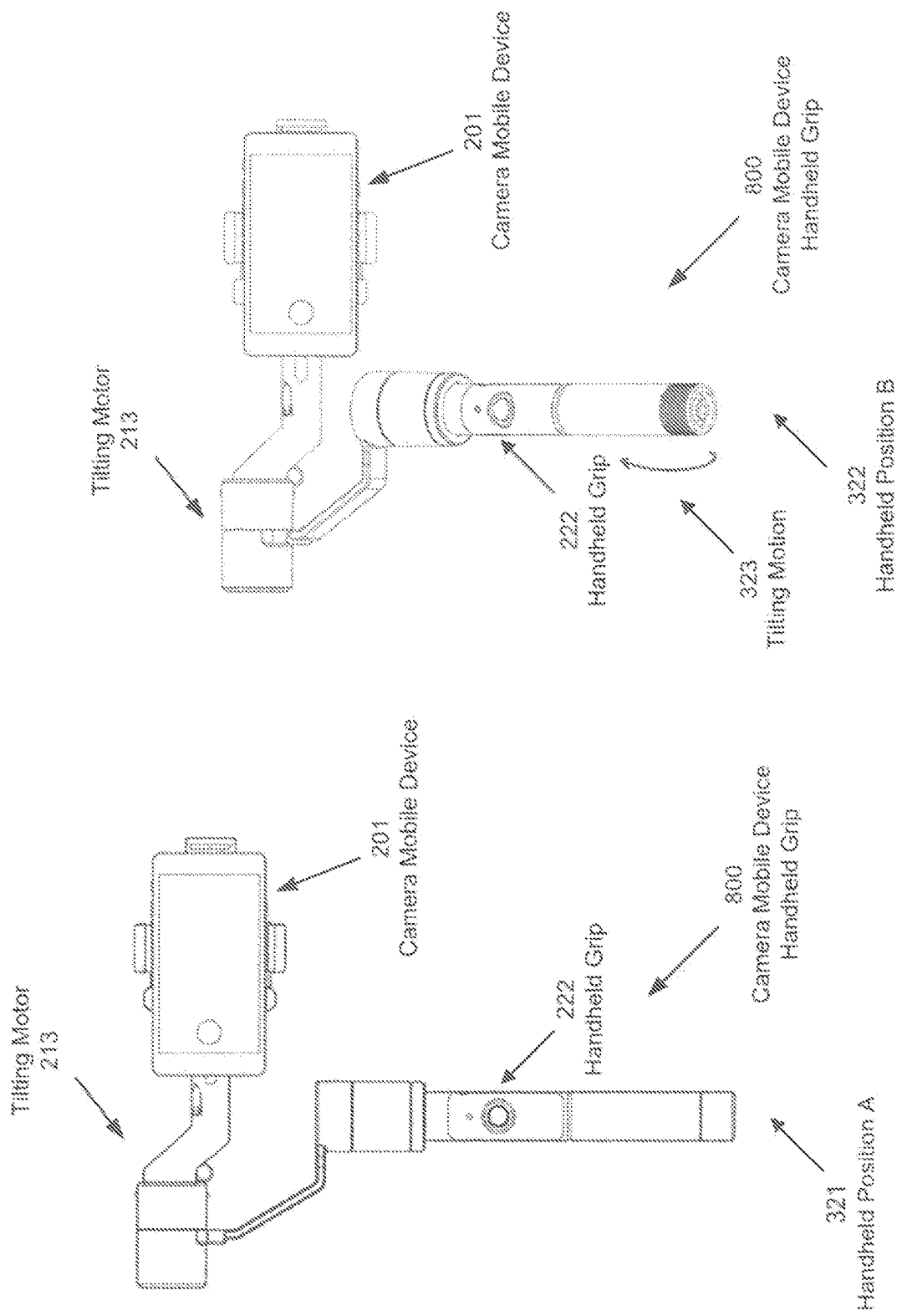
FIG. 3.2

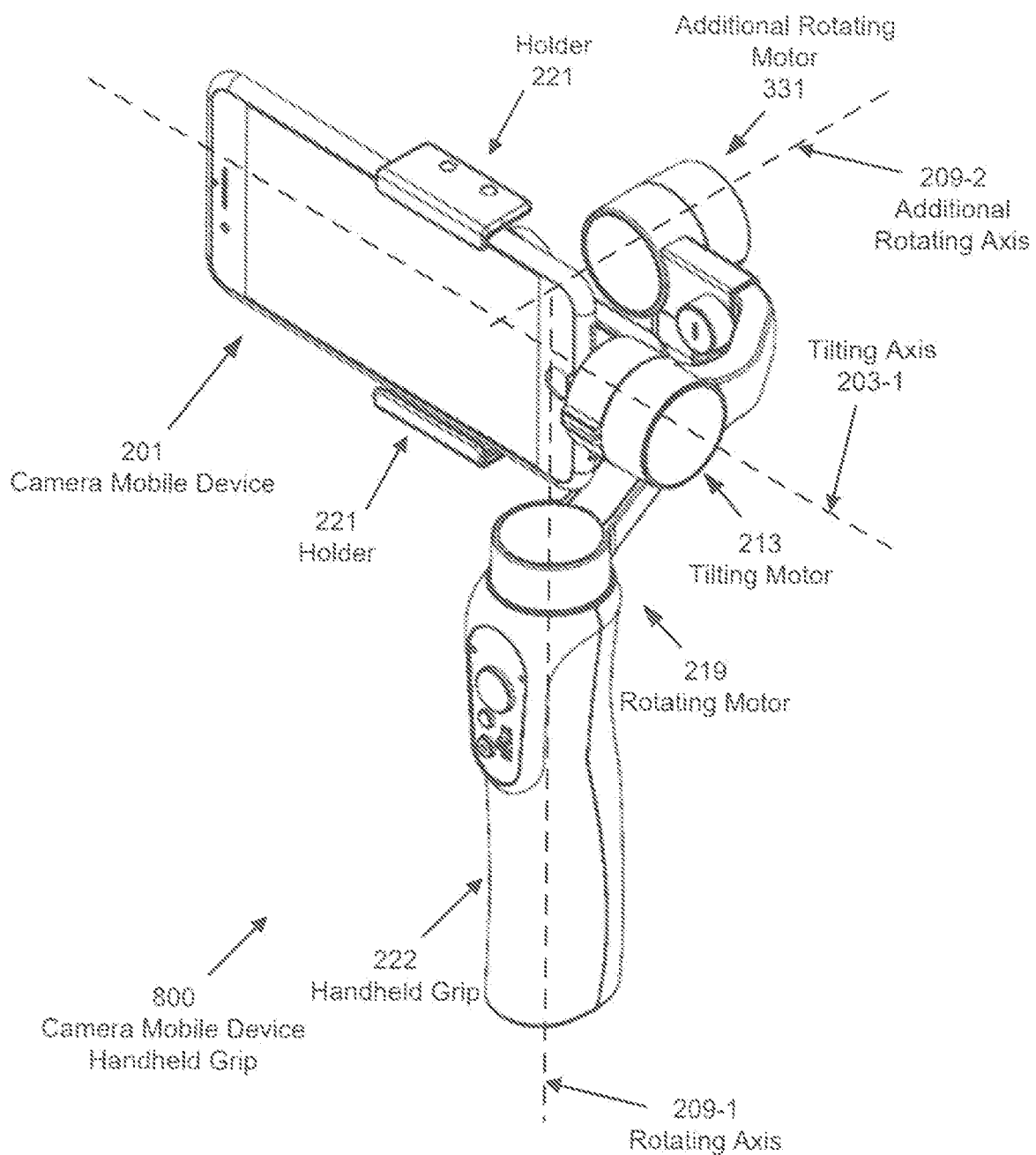
FIG. 3.3

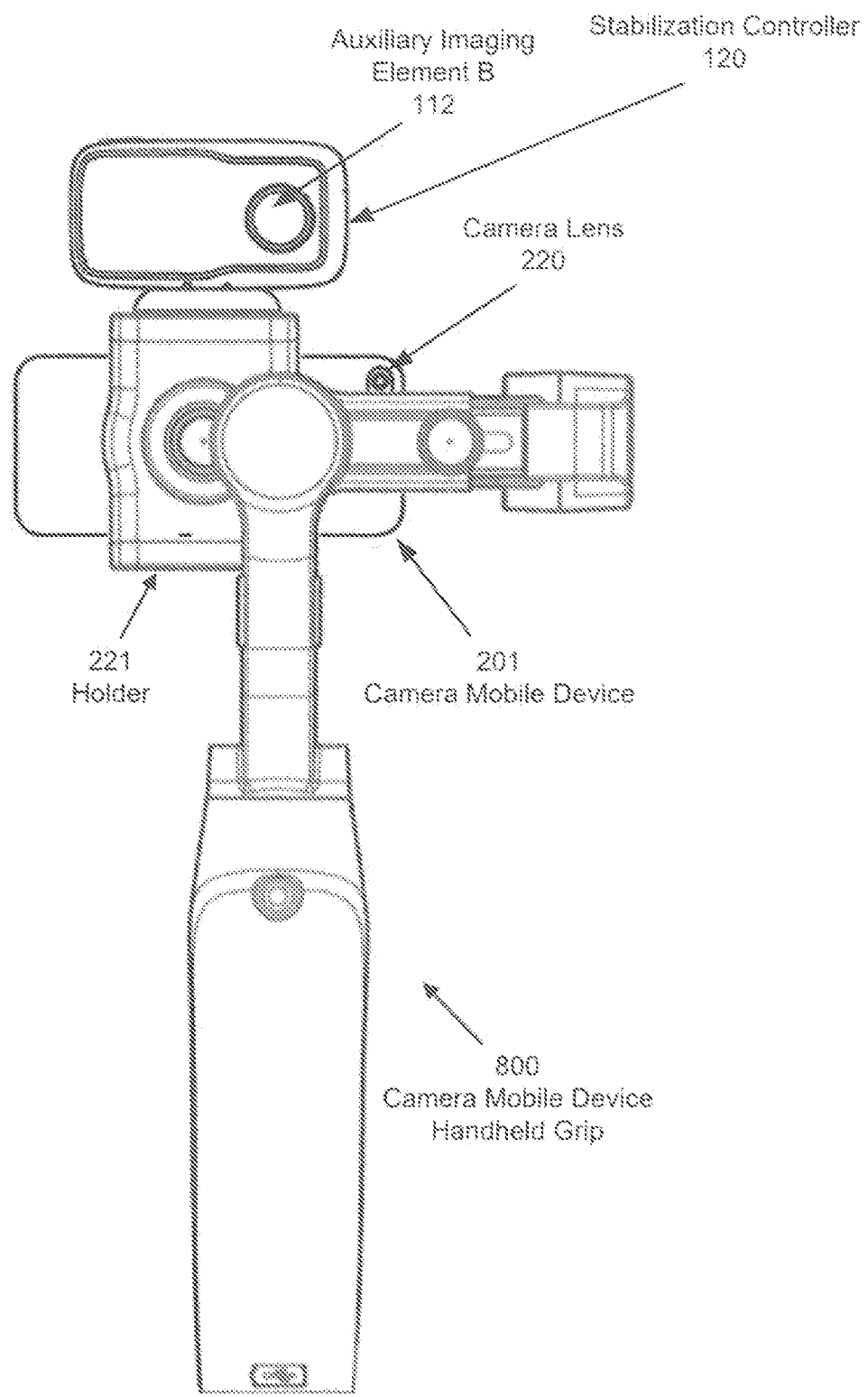
FIG. 3.4

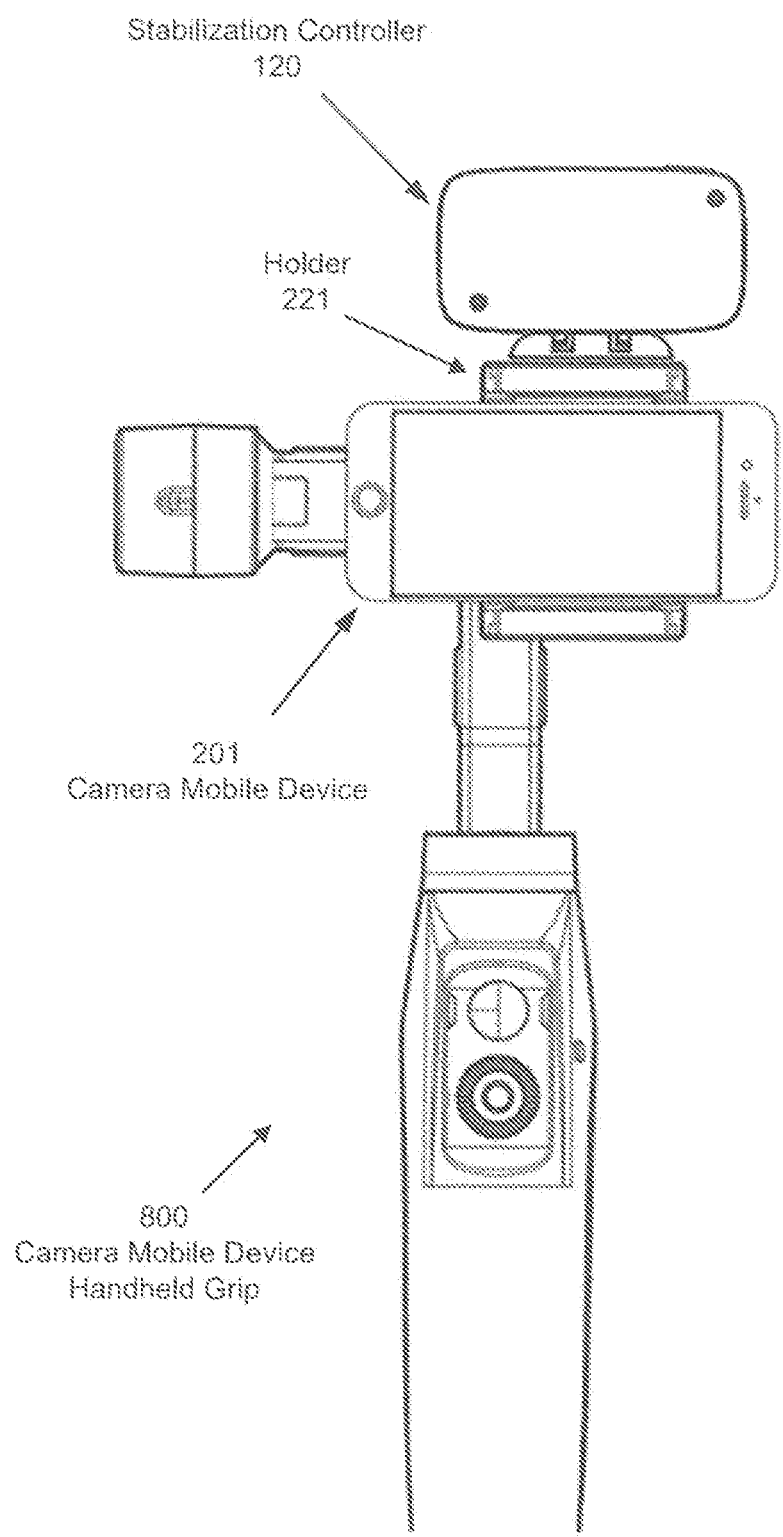
FIG. 3.5

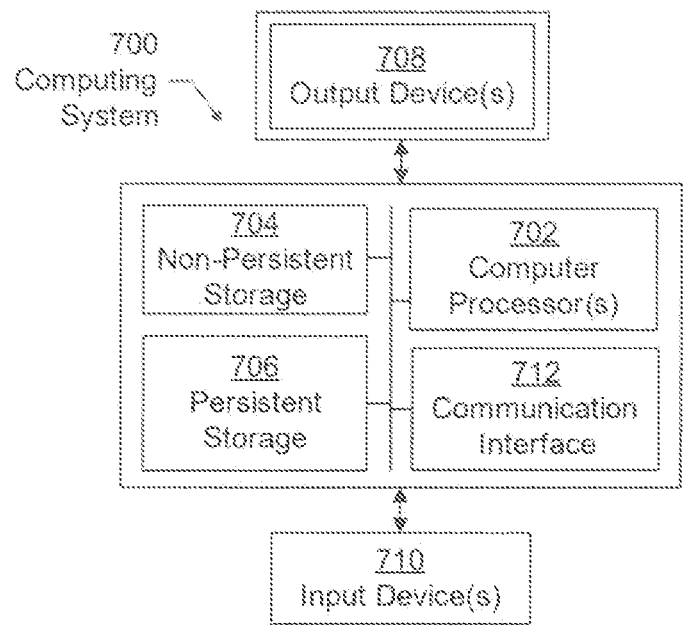
*FIG. 7.1*
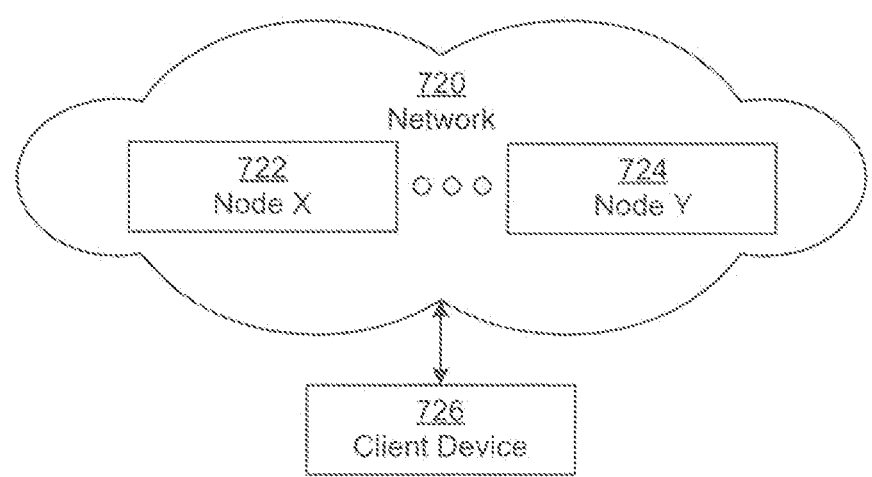
*FIG. 7.2*

CAMERA MOBILE DEVICE STABILIZATION USING A HIGH FRAME RATE AUXILIARY IMAGING ELEMENT

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera. During image capturing using a handheld camera, movement of the camera often causes unintentional changes of object position in the captured images.

Hand shaking of a camera user often results in blurry or out-of-focus images or videos. Gimbal or stabilizer are used for stabilizing a camera device during image capturing. Such solutions require two or more motion sensors, e.g., gyroscopes, with associated electronic circuits to obtain information for computing control signal(s) to correct the user hand shaking. Motion sensors and associated electronic circuits increase manufacturing cost and product size.

SUMMARY

In general, in one aspect, the invention relates to a method to stabilize image capture for a camera device. The method includes capturing, at an auxiliary frame rate and using an auxiliary imaging element rigidly coupled with the camera device, a plurality of auxiliary images of a light source attached to an object, wherein the auxiliary frame rate exceeds a camera frame rate of the image capture, detecting each of a plurality of locations of the light source in a corresponding one of the plurality of auxiliary images, analyzing the plurality of locations to generate a measure of uncontrolled movement, and adjusting, based at least on the measure of uncontrolled movement, the camera device during the image capture of the object by the camera device at the camera frame rate.

In general, in one aspect, the invention relates to a stabilized camera device holder for stabilizing image capture. The stabilized camera device holder includes a computer processor, memory storing instructions, when executed, causing the computer processor to receive, from an auxiliary imaging element rigidly coupled with a camera device, a plurality of auxiliary images of a light source attached to an object, wherein the plurality of auxiliary images are captured by the auxiliary imaging element at an auxiliary frame rate that exceeds a camera frame rate of the image capture, detect each of a plurality of locations of the light source in a corresponding one of the plurality of auxiliary images, analyze the plurality of locations to generate a measure of uncontrolled movement, and adjust, based at least on the measure of uncontrolled movement, the camera device during the image capture of the object by the camera device at the camera frame rate, and at least one motor configured to adjust, based at least on the measure of uncontrolled movement, the camera device during the image capture of the object by the camera device at the camera frame rate.

In general, in one aspect, the invention relates to a stabilization controller device for stabilizing image capture. The stabilization controller device includes a computer processor and memory storing instructions, when executed, causing the computer processor to receive, from an auxiliary imaging element rigidly coupled with a camera device, a plurality of auxiliary images of a light source attached to an object, wherein the plurality of auxiliary images are captured by the auxiliary imaging element at an auxiliary frame rate that exceeds a camera frame rate of the image capture, detect each of a plurality of locations of the light source in a corresponding one of the plurality of auxiliary images, analyze the plurality of locations to generate a measure of uncontrolled movement, and adjust, based at least on the measure of uncontrolled movement, the camera device during the image capture of the object by the camera device at the camera frame rate.

In general, in one aspect, the invention relates to a non-transitory computer readable medium storing instructions for stabilizing image capture for a camera device. The instructions, when executed by a computer processor, comprising functionality for capturing, at an auxiliary frame rate and using an auxiliary imaging element rigidly coupled with the camera device, a plurality of auxiliary images of a light source attached to an object, wherein the auxiliary frame rate exceeds a camera frame rate of the image capture, detecting each of a plurality of locations of the light source in a corresponding one of the plurality of auxiliary images, analyzing the plurality of locations to generate a measure of uncontrolled movement, and adjusting, based at least on the measure of uncontrolled movement, the camera device during the image capture of the object by the camera device at the camera frame rate.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

FIGS. 1.3 and 1.4 show example diagrams in accordance with one or more embodiments of the invention.

FIGS. 2.1 and 2.2 show method flowcharts in accordance with one or more embodiments of the invention.

FIGS. 3.1, 3.2, 3.3, 3.4, 3.5, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 14:
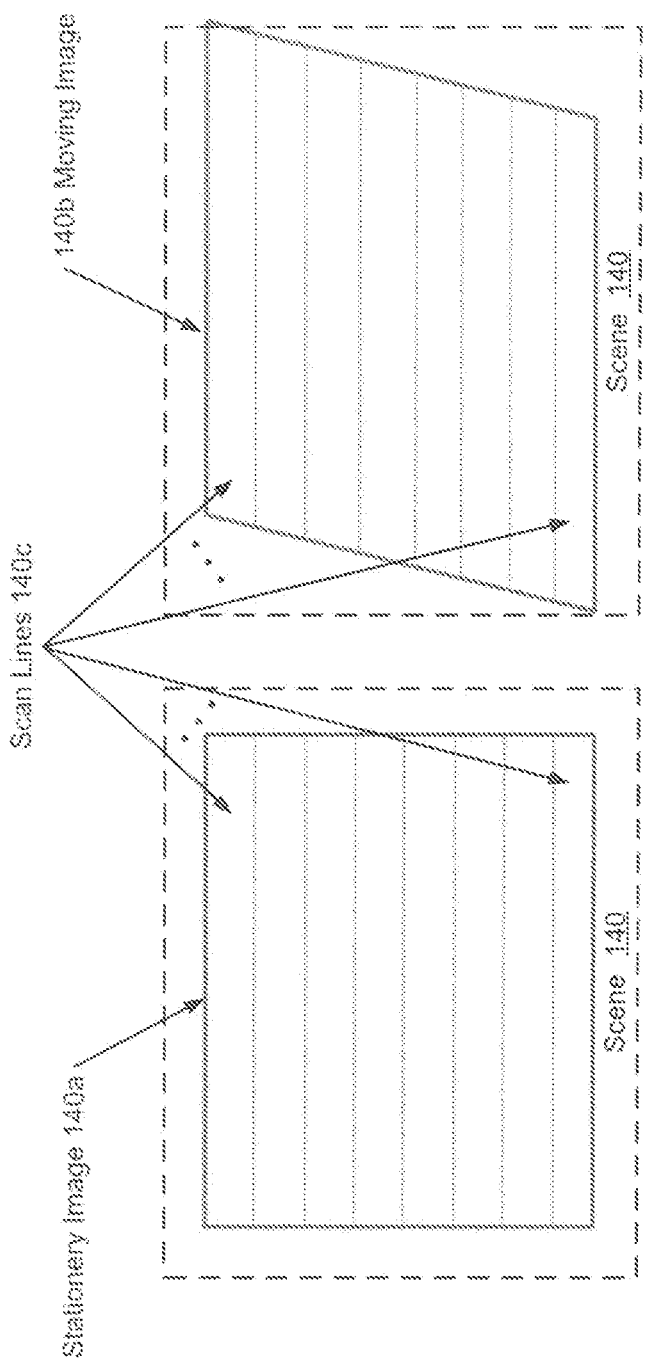
Figure 22:
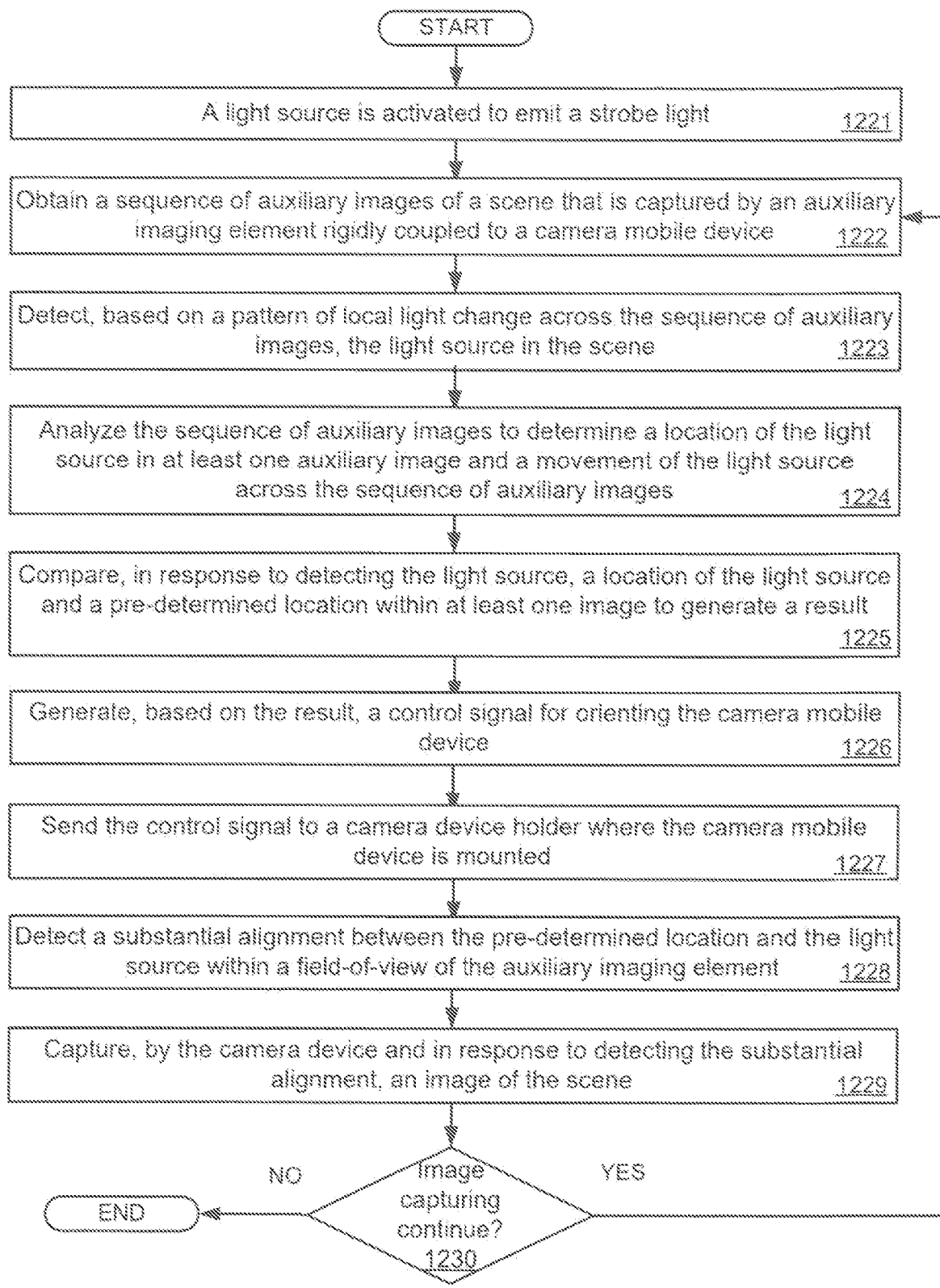

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a device, a system, and a computer readable medium for stabilizing a camera device during image capturing. In particular, auxiliary images of a light source attached to an object are captured using an auxiliary imaging element. The auxiliary imaging element is rigidly coupled with the camera device and has an auxiliary frame rate that exceeds the camera frame rate. Locations of the light source in the auxiliary images are detected and analyzed to generate a measure of uncontrolled movement. The measure of uncontrolled movement is used to adjust the camera device during the image capture of the object by the camera device. In one or more embodiments, adjusting the camera device is by generating a control signal based on the measure of uncontrolled movement to adjust a stabilized camera device holder holding the camera device. In particular, the measure of uncontrolled movement may represent user hand shaking when holding the stabilized camera device holder. Such adjustment mitigates image blurring of the camera device caused by the user hand shaking.

In one or more embodiments, the locations of the light source detected in the auxiliary images are further analyzed to generate a measure of controlled movement. In one or more embodiments, the control signal is generated further based on the measure of controlled movement to adjust the stabilized camera device holder. In particular, the measure of controlled movement may represent movement of the object in the scene. Such adjustment allows the stabilized camera device holder to track the object movement such that the object appears at a target position in the images generated by the camera device. In one or more embodiments, the measure of controlled movement is used to mitigate a rolling shutter effect of the camera device.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having an imaging element A (111), an stabilization controller (120) associated with an imaging element B (112), a camera device holder (130), a scene (140), a field-of-view (FOV) (141), an object (142) appearing within the FOV (141), and a light source (143) attached to the object (142). Further, the camera device (110) with the imaging element A (111), the stabilization controller (120) with the imaging element B (112), and the camera device holder (130) are communicatively coupled to each other. In particular, the stabilization controller (120) and the camera device holder (130) are collectively referred to as a stabilized camera device holder (135). In one or more embodiments of the invention, two or more of the camera device (110), the stabilization controller (120), the imaging element B (112), and the camera device holder (130) are integrated into a single device. For example, at least a portion of the stabilization controller (120) may be included in the camera device (110). In another example, at least a portion of the stabilization controller (120) may be included in the camera device holder (130). In still another example, one part of the stabilization controller (120) is included in the camera device (110) while another part of the stabilization controller (120) is included in the camera device holder (130). In a further example, the imaging element B (112) may be integrated with the stabilization controller (120) or the camera device holder (130). Depending on which of the examples, the stabilized camera device holder (135) may be a logical combination or a physical combination of the stabilization controller (120) and the camera device holder (130). In one or more embodiments, the imaging element A (111) and the imaging element B (112) are rigidly coupled to each other such that any user hand shaking affects both the imaging element A (111) and the imaging element B (112) to the same extent. For example, the imaging element B (112) may be embedded in the camera device holder (130), which rigidly holds the camera device (110) where the imaging element A (111) is a part of.

In one or more embodiments of the invention, the imaging element A (111) of the camera device (110) is configured to generate (i.e., capture) images (e.g., image X (126x) depicted in FIG. 6 below) of the scene (140). In one or more embodiments, the imaging element A (111) is sensitive to visible light (e.g., having wavelength in the range of 390 to 700 nanometers (nm)) and the captured images (e.g., image X (126x) depicted in FIG. 6 below) are visible images, such as a photograph or frames in a video recording. In one or more embodiments of the invention, the imaging element B (112) is configured to generate auxiliary images (e.g., image A (126a) depicted in FIGS. 1.2, 5, and 6 below) of the scene (140). In this context, the imaging element B (112) is referred to as an auxiliary imaging element. In particular, the imaging element B (112) is sensitive to the light emitted or reflected by the light source (143) such that the light source (143) appears in the captured auxiliary images. In one or more embodiments, the light source (143) emits or reflects infrared light (e.g., having wavelength in the range of 700 nm to 1 millimeter (mm)) and the imaging element B (112) is an infrared imaging element. As described below, the auxiliary images are used to mitigate user hand shaking and stabilize image capture of the camera device (110). In this context, the imaging element B (112) is referred to as an auxiliary imaging element. For example, the imaging element A (111) and imaging element B (112) may include a CMOS (complementary metal oxide semiconductor) cell array, a CCD (charge coupled device) array, or other types of photo-sensor array that are sensitive to visible light and/or infrared light.

In one or more embodiments of the invention, the light source (143) is any device that emits or reflects light, such as infrared light described above. In one or more embodiments, the light source (143) includes a light-emitting-diode (LED). In one or more embodiments, the light source (143) includes a reflective region of (or attached to) the object (142). In one or more embodiments, the light source (143) emits a strobe light, which changes intensity and/or color from time to time. In one or more embodiments, the light source (143) reflects the strobe light emitted by a remote light emitter (not shown). For example, the strobe light may emit a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or color change in the light. In one or more embodiments, the light source (143) emits or reflects a light change pattern with a high repetition rate (e.g., 1 kilohertz (kHz), 2 kHz, etc.) comparing to a camera frame rate of the camera device (110) and an auxiliary frame rate of the imaging element B (112). The camera frame rate is a number of images (e.g., a burst of still images or a video recording) captured by the imaging element A (111) of the camera device (110) during a unit time. The auxiliary frame rate is the number of images (e.g., a burst of still images or a video recording) captured by the imaging element B (112) during the unit time. In one or more embodiments, the light source (143) emits or reflects a light change pattern that is synchronized with the camera frame rate of the imaging element A (111) and/or the auxiliary frame rate of the imaging element B (112). In one or more embodiments, the camera frame rate of the imaging element A (111) is 24 Hz, 25 Hz, 30 Hz, 50 Hz, or 60 Hz. In one or more embodiments, the auxiliary frame rate of the imaging element B (112) is between 6 times and 10 times of the camera frame rate.

In one or more embodiments of the invention, the camera device (110) is a device with the imaging element A (111) and associated components for taking photographs and/or video recordings. A dedicated camera (e.g., a point-and-shoot camera or a digital-single-lens-reflective (DSLR) camera) with communication capability (e.g., Bluetooth, WiFi, etc.) is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The imaging element A (111) may be on the front surface or back surface of the smart phone. In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7.1 and 7.2 below.

In one or more embodiments, the scene (140) is a place where an action or event, imaged by the camera device (110), occurs. The field-of-view (FOV) (141) corresponds to an extent of the scene (140) that is imaged by the camera device (110) using the imaging element A (111), thus is referred to the FOV of the camera device (110) or FOV of the imaging element A (111). The object (142) inside the FOV (141) will appear in an image captured and/or outputted by the camera device (110). The FOV (141) may also correspond to an extent of the scene (140) that is imaged by the imaging element B (112), thus is referred to as the FOV of the imaging element B (112). The light source (143) inside the FOV (141) will appear in an auxiliary image captured and/or outputted by the imaging element B (112). For example, the FOV (141) may correspond to a solid angle within which the imaging element A (111) or imaging element B (112) receives light input to an associated optical sensor (not shown) of the imaging element A (111) or imaging element B (112). In one or more embodiments, the FOV (141) corresponds to different portions of the scene (140) according to how the imaging element A (111) and imaging element B (112) oriented toward, zoomed with respect to, or otherwise positioned relative to, the scene (140). Based on the rigid coupling of the imaging element A (111) and imaging element B (112), the FOV of the imaging element A (111) may be a rigid portion of the FOV of the imaging element B (112), or vice versa. In other words, in some cases, the FOV of the imaging element B (112) may be a rigid portion of the FOV of the imaging element A (111). In a particular case, the FOV of the imaging element A (111) may be substantially aligned with the FOV of the imaging element B (112).

In one or more embodiments of the invention, the camera device holder (130) is configured to mechanically hold the camera device (110) and to adjust, in response to a control signal from the stabilization controller (120), the FOV (141) of the imaging element A (111). For example, the camera device holder (130) may include a motorized tilt and swivel device for adjusting a camera angle of the imaging element A (111). In another example, the camera device holder (130) may include a motorized horizontal and vertical sliding device for adjusting a position of the imaging element A (111) relative to the scene (140). The sliding device may include a mechanical stage for holding and moving the camera device (110). Examples of the camera device holder (130) are described in reference to FIGS. 3.1-3.5 below.

In one or more embodiments, the stabilization controller (120) includes a hardware component, a software component, or a combination thereof that is configured to generate the aforementioned control signal to adjust the FOV (141) of the imaging element A (111). In particular, the stabilization controller (120) uses a pre-determined algorithm to generate the control signal based on the auxiliary images captured by the imaging element B (112). In one or more embodiments, the stabilization controller (120) includes a timer to control the auxiliary frame rate of the imaging element B (112) based on the duty cycle and/or repetition rate of the light source (143). An example of generating the control signal based on the auxiliary images is described in reference to FIGS. 4-6 below. For example, the stabilization controller (120) may control the FOV (141) by way of controlling the camera device holder (130) using the control signal. In another example, the stabilization controller (120) may further control the FOV (141) by way of controlling a zoom level of the imaging element A (111) using the control signal. In one or more embodiments, the stabilization controller (120) controls the FOV (141) such that the object (142) appears in a stable position within the FOV (141). In one or more embodiments, the stabilization controller (120) controls the FOV (141) such that the object (142) moves toward a target position within the FOV (141). In one or more embodiments, the stabilization controller (120) controls the FOV (141) such that the object (142) moves with improved stability/smoothness toward a target position within the FOV (141). In one or more embodiments, the stabilization controller (120) controls the FOV (141) using the method described in reference to FIGS. 2.1 and 2.2 below. In one or more embodiments, the stabilization controller (120) include the components described in reference to FIG. 1.2 below.

FIG. 1.2 shows details of the stabilization controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the stabilization controller (120) includes a hardware processor (121), memory (122), and repository (123). In one or more embodiments of the invention, the hardware processor (121) corresponds to the computer processor(s) (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform FOV adjustment functionalities of the camera device (110) depicted in FIG. 1.1 above. In one or more embodiments, the FOV adjustment functionalities stabilize image captures of the camera device (110). In one or more embodiments, the FOV adjustment functionalities includes object tracking during image captures of the camera device (110). In one or more embodiments, the stabilization controller (120) performs the FOV adjustment functionalities according to the method flowchart described in reference to FIGS. 2.1 and 2.2 below. In one or more embodiments, the memory (122) stores instructions to perform one or more portions of the method flowchart described in reference to FIGS. 2.1 and 2.2 below. In one or more embodiments, at least a portion of the stabilization controller (120) and the camera device (110) are integrated into a single device. In such embodiments, the instructions to perform one or more portions of the method flowchart described in reference to FIGS. 2.1 and 2.2 are part of a mobile application, or mobile app, which is a user-installable software application designed to run on a smart phone or other mobile devices. In one or more embodiments, at least a portion of the stabilization controller (120) and the camera device holder (130) are integrated into a single device. In such embodiments, the instructions to perform one or more portions of the method flowchart described in reference to FIGS. 2.1 and 2.2 are part of a local application (e.g., installed software, embedded firmware) designed to run on the camera device holder (130).

Further as shown in FIG. 1.2, the repository (123) includes a sequence of auxiliary images (126), a light change pattern (124), a displacement (125), an uncontrolled movement parameter (125a), a controlled movement parameter (125b), a target position (127), a predicted trajectory (128), and a motor control parameter (129). In particular, the sequence of auxiliary images (126) includes consecutive images (e.g., image A (126a)) captured by the imaging element B (112). For example, the image A (126a) corresponds to a portion of the scene (140) that is covered by the FOV of the imaging element B (112) at a particular time point.

The light change pattern (124) is a pattern of light intensity and/or color alternating between different intensity levels and/or colors across the sequence of auxiliary images (126). In one or more embodiments, the light change pattern (124) corresponds to a spot in each image of the sequence of auxiliary images (126). For example, the spot may be defined by a pixel position or a collection of connected pixel positions in each image. In one or more embodiments, the light change pattern (124) is caused by a strobe light emitted from or reflected by the light source (143) and indicates a location of the light source (143) within each image. In other words, the location of the light source (143) within each image may be determined based on where the light change pattern (124) is found across the sequence of auxiliary images (126). For example, the light change pattern (124) indicates that the light source (143) is at the location A (126b) in the image A (126a). Similarly, each other image in the sequence of auxiliary images (126) is associated with a location of the light source (143).

In one or more embodiments, the light source (143) is attached to the object (142) such that the location of the light source (143) in an image represents the location of the object (142). The target position (127) is a pre-determined position that the stabilization controller (120) is configured for tracking the object (142) during image captures. For example, the target position (127) may be defined as the center of the FOV (141), which corresponds to the center of the image. In other words, the stabilization controller (120) is configured to adjust the FOV (141) such that the object (142) appears at the center (i.e., target position (127)) in the image after the adjustment. In other examples, the target position (127) may be defined as different positions from the center of the FOV (141). In those embodiments where the FOVs of the imaging element A (111) and imaging element B (112) are not aligned with each other, the target position (127) may be adjusted to account for any offset between the center of FOV of the imaging element A (111) and the center of FOV of the imaging element B (112).

The displacement (125) is the distance between the target position (127) and the location (e.g., location A (127a)) of the light source (143) within an image. In one or more embodiments, the displacement (125) includes a horizontal direction distance and a vertical distance. The displacement (125) may be represented based on a number of pixels or any other suitable distance scale.

The uncontrolled movement parameter (125a) and controlled movement parameter (125b) represent variations of the location (e.g., location A (127a)) of the light source (143) from one image to next in the sequence of auxiliary images (126). As used herein, controlled movement is a predicted trajectory of an object appearing across consecutive auxiliary images, and uncontrolled movement is a deviation from the predicted trajectory of the object appearing across consecutive auxiliary images. In one or more embodiments, the uncontrolled movement parameter (125a) and the controlled movement parameter (125b) are measured based on image pixels. In one or more embodiments, the uncontrolled movement parameter (125a) represents user handshaking, and the controlled movement parameter (125b) represents movement of a moving object in the scene (140) and/or movement of the camera device (110) relative to the scene (140). In one or more embodiments, the object (142) is a moving object where the predicted trajectory (128) represents the movement trajectory of the moving object. In one or more embodiments, the camera device (110) is moving relative to the scene (140) where the predicted trajectory (128) represents the relative movement between the object (142) from the point of view of the camera device (110). For example, the user may be holding the camera device holder (130) with the camera device (110) in a traveling vehicle such that a stationery object (142) may appear to be moving. Further details of the uncontrolled movement parameter (125a), controlled movement parameter (125b), and predicted trajectory (128) are described in reference to FIG. 1.3 below.

Because the imaging element A (111) and imaging element B (112) are rigidly coupled to each other, the position where the object (142) appears in the FOVs of the imaging element A (111) or imaging element B (112) depends on the orientation of the camera device (110). Accordingly, the object (142) may be aligned with the target position (127) in the FOV (141) by changing the orientation of the camera device (110). In one or more embodiments, the motor control parameter (129) corresponds to control information for controlling the motors of the camera device holder (130) to stabilize image capturing or perform object tracking using the camera device (110). In one or more embodiments, motor control parameter (129) is generated by the stabilization controller (120) based on one or more of the uncontrolled movement parameter (125a), controlled movement parameter (125b), and predicted trajectory (128) described above. In one or more embodiments, the motor control parameter (129) specifies, for any particular time point, a rotation change amount, a tilt change amount, a shift change amount, or other amount of change to be sent to the camera device holder (130) to mitigate user handshaking or to orient the camera device (110) toward the moving object (142). In one or more embodiments, the motor control parameter (129) is sent to the camera device holder (130) as a control signal for controlling the motors thereof. For example, the control signal may be a digital electronic signal or an analog electronic signal. Examples of controlling the motors of the camera device holder (130) are described in reference to FIGS. 3.1-3.5 below.

An example of the sequence of auxiliary images (126), light change pattern (124), target position (127), displacement (125), and motor control parameter (129) is described in reference to FIGS. 4-6 below.

FIG. 1.3 shows example details of the uncontrolled movement parameter (125a), controlled movement parameter (125b), and predicted trajectory (128) based on the legend (131). In one or more embodiments, one or more of the modules and elements shown in FIG. 1.3 may be omitted, repeated, and/or substituted. Accordingly, embodiments of the invention should not be considered limited to the specific arrangements of modules shown in FIG. 1.3.

As shown in FIG. 1.3, the vertical axis (denoted as X) represents jitter (e.g., horizontal location) of the light source (143) detected in each of the sequence of auxiliary images (126), and the horizontal axis (denoted as T) represents time. In particular, each circle represents the vertical location of the light source (143) detected in each even image in the sequence of auxiliary images (126), while each solid dot represents the vertical location of the light source (143) detected in each odd image in the sequence of auxiliary images (126). Along the horizontal axis, Δt represents time between the even and odd images. In other words, Δt (e.g., 1 ms) equals the inverse of auxiliary frame rate of the imaging element B (112). In addition, Δy (e.g., 5 ms) represents the sampling time for determining the predicted trajectory (128) of the object (142). In comparison, the time between image capture of the camera device (110) using the imaging element A (111) may be 33 ms if the camera frame rate is 30 Hz.

In one or more embodiments, the stabilization controller (120) generates the predicted trajectory (128) by applying a curve fitting algorithm to the horizontal locations of the light source (143) detected in the sequence of auxiliary images (126) during each Δy sampling time period. In other words, the predicted trajectory (128) approximates the circles and solid dots within each Δy sampling time period. In the example shown in FIG. 1.3, the approximated curve is a linear segment within each Δy sampling time period. In other example, different type of curvelinear approximation may be used. Accordingly, the uncontrolled movement parameter (125a) is computed as deviation of the detected location of the light source (143) from the predicted trajectory (128). As described above, the uncontrolled movement parameter (125a) may represents user handshaking during image captures. Using a stationery reference location denoted by the dashed line, the controlled movement parameter (125b) corresponds to the deviation of the predicted trajectory (128) from the stationary reference location. As described above, the controlled movement parameter (125b) may represents relative movement between the object (142) and the camera device (110).

While FIG. 1.3 depicts horizontal portions of the uncontrolled movement parameter (125a), controlled movement parameter (125b), and predicted trajectory (128), vertical portions of the uncontrolled movement parameter (125a), controlled movement parameter (125b), and predicted trajectory (128) may be determined by the stabilization controller (120) in a similar manner.

FIG. 1.4 shows an example rolling shutter effect in accordance with one or more embodiments. In one or more embodiments, one or more of the modules and elements shown in FIG. 1.4 may be omitted, repeated, and/or substituted. Accordingly, embodiments of the invention should not be considered limited to the specific arrangements of modules shown in FIG. 1.4.

As shown in FIG. 1.4, the stationery image (140a) represents a portion of the scene (140) that is captured by the imaging element A (111) or imaging element B (112) when the imaging element A (111) and imaging element B (112) are stationery with respect to the scene (140). In contrast, the moving image (140b) represents a portion of the scene (140) that is captured by the imaging element A (111) or imaging element B (112) when the imaging element A (111) and imaging element B (112) are moving relative to the scene (140). For example, the stabilization controller (120) with the camera device (110) may be held by a user in a traveling vehicle. In another example, the camera device (110) may be moved (e.g., rotated, tilted, etc.) by the stabilization controller (120) to track the object (142) when there is relative movement between the object (142) and the camera device (110). In one or more embodiments, the imaging element A (111) or imaging element B (112) is based on a CMOS sensor with a rolling shutter. In other words, the stationery image (140a) and moving image (140b) are composed by multiple scan lines (140c) that are captured sequentially in time. The rolling shutter effect is the distortion of the moving image (140b) due to the relative movement between the object (142) and the camera device (110). As shown in FIG. 1.4, the distortion corresponds to vertical misalignment (or shift) of the multiple scan lines (140c) captured sequentially in time. In one or more embodiments, the predicted trajectory (128) and/or the controlled movement parameter (125b) are used to correct the distortion (e.g., misalignment or scan line shift) of the image captured by the camera device (110).

FIG. 2.1 shows a flowchart in accordance with one or more embodiments. In particular, the flowchart is an example of generating the aforementioned control signal for adjusting the FOV of the camera device. The process shown in FIG. 2.1 may be executed, for example, by one or more components discussed above in reference to FIGS. 1.1 and 1.2. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially in Step 1211, a sequence of auxiliary images of an light source attached to an object is captured at an auxiliary frame rate using an auxiliary imaging element. The auxiliary imaging element is rigidly coupled with a camera device.

In Step 1212, each location of a sequence of locations of the light source is detected in a corresponding auxiliary image of the sequence of auxiliary images. In one or more embodiments, the location of the light source is detected using the method described in reference to FIG. 2.2 below.

In Step 1213, the sequence of locations is analyzed to generate a measure of controlled movement and a measure of uncontrolled movement. In one or more embodiments, as described in reference to FIG. 1.3 above, the measure of controlled movement and the measure of uncontrolled movement are generated by applying a curve fitting algorithm to the detected locations of the light source in the sequence of auxiliary images.

In Step 1214, a control signal is generated based on the measure of uncontrolled movement for adjusting a field-of-view (FOV) of the camera device to stabilize the image capture. In one or more embodiments, the control signal is generated to orient the camera device to compensate the uncontrolled movement.

In Step 1215, the control signal is further generated based on the measure of controlled movement for adjusting the FOV of the camera device to track an object moving in the FOV of the camera device. In one or more embodiments, the control signal is generated to orient the camera device to compensate the controlled movement. In one or more embodiments, the control signal is further generated to track a moving object using the method described in reference to FIG. 2.2 below.

In Step 1216, distortion in a captured image due to a rolling shutter effect is corrected based on the measure of controlled movement. In one or more embodiments, the distorting includes misalignment or shift between scan lines captured by the imaging element of the camera device. Accordingly, the misalignment or shift is compensated based on the measure of controlled movement. For example, the misaligned scan lines may be shifted in reverse direction where the extent and direction of the reverse shift is based on the measure of controlled movement.

In Step 1217, a determination is made as to whether the image capturing has completed. If the determination is negative, i.e., the image capturing is continuing, the method returns to Step 1211. If the determination is positive, i.e., the image capturing is completed, the method ends.

FIG. 2.2 shows a flowchart in accordance with one or more embodiments. In particular, the flowchart is an example of generating the aforementioned control signal for tracking a moving object. The process shown in FIG. 2.2 may be executed, for example, by one or more components discussed above in reference to FIGS. 1.1 and 1.2. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially, in Step 1221, a light source within a scene is activated. In one or more embodiments of the invention, the light source is attached to an object in the scene. In one or more embodiments, the light source emits or reflects a strobe light, which changes intensity and/or color from time to time. For example, the strobe light emits a free-running light pattern in response to the light source being activated (e.g., turned on).

In Step 1222, a sequence of auxiliary images of the scene is captured by an auxiliary imaging element that is rigidly coupled to a camera device. In particular, the object is within the field-of-view (FOV) of the auxiliary imaging element and appears in the sequence of auxiliary images. For example, the sequence of auxiliary images may include or be part of a burst of still images. In another example, the sequence of auxiliary images may include or be part of a video recording. In one or more embodiments, the sequence of auxiliary images of the scene is captured while the light source emits or reflects the strobe light. In one or more embodiments, the frame rate of the sequence of auxiliary images is selected based on the duty cycle and/or repetition rate of the light source such that consecutive images (or a pair of images with a particular separation in the sequence) include alternating bright level and dark level, and/or alternating colors from the light source. For example, the light source may be free running and the frame rate is selected based on a pre-determined duty cycle and/or repetition rate of the free running light source. In one or more embodiments, a timer is used to control image capture according to the selected frame rate.

In one or more embodiments, the duty cycle and/or repetition rate of the light source is selected based on the frame rate of the sequence of auxiliary images such that consecutive images (or a pair of images with a particular separation in the sequence) include alternating bright level and dark level, and/or alternating colors from the light source. For example, the frame rate may be pre-determined and the light source is synchronized to the frame rate, e.g., based on a trigger signal from the auxiliary imaging element or a stabilization controller that controls the auxiliary imaging element.

In Step 1223, based on a local light change pattern across the sequence of auxiliary images, the light source is detected in the scene. Specifically, the strobe light emitted from or reflected by the light source causes changes in light intensity and/or color received by the auxiliary imaging element resulting in the local light change pattern across the sequence of auxiliary images. In one or more embodiments, the intensity of the strobe light is adjusted to control the size of the location where the local intensity change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating colors, in consecutive images, as recognized by the auxiliary imaging element, exceeds a pre-determined threshold. In one or more embodiments, the location is referred to as the location of the light source in the image.

In one or more embodiments, a pair of images in the sequence of auxiliary images are compared by subtraction of intensity and/or color values of corresponding pixels. Specifically, the intensity and/or color values are generated by the auxiliary imaging element. In particular, the intensity and/or color value of a pixel in one image is subtracted from the intensity and/or color value of the corresponding pixel in another image to generate a subtraction result. The pixel where the difference in alternating bright level and dark level, and/or alternating colors, is found in the subtraction result is selected as part of the location of the light source in the image. Depending on the duty cycle/repetition rate of the light source versus the frame rate of the sequence of auxiliary images, the pair of images may be consecutive images or two images separated by a particular number of images, such as every three images, etc.

In Step 1224, the sequence of auxiliary images is analyzed to determine a location of the light source in at least one image and a movement of the light source across the sequence of auxiliary images. In one or more embodiments, the location of the light source is determined based on where the difference in alternating bright level and dark level, and/or alternating colors in the sequence of auxiliary images, as recognized by the auxiliary imaging element, exceeds the pre-determined threshold. In one or more embodiments, the movement of the light source is determined based on a rate of change of the location over the sequence of auxiliary images.

In Step 1225, in response to detecting the light source, the location of the light source and a target position within at least one image are compared to generate a result. In one or more embodiments, the result includes the displacement from the location to the target position. In one or more embodiments, the displacement may vary from one image to next in the sequence of auxiliary images, indicating that the object is a moving object. In such embodiments, the rate of change of the displacement over time, e.g., from one image to next, is computed as a movement parameter.

In Step 1226, a control signal is generated based on the result for orienting the camera device. In one or more embodiments, the control signal is configured to adjust the orientation of the camera device in the opposite direction to the displacement. For example, if the displacement indicates that the target position is to the right of the light source location within the image, the control signal adjusts the orientation of the camera device toward the left. In one or more embodiments, the control signal is configured to adjust the relative position of the camera with respect to the scene in the opposite direction to the displacement. For example, if the displacement indicates that the target position is to the right of the light source location within the image, the control signal adjusts the relative position of the camera toward the left. In one or more embodiments, the movement parameter is considered in fine tuning the amount of adjustment caused by the control signal.

In Step 1227, the control signal is sent to a camera device holder (e.g., a tilt-and-swivel device or a mechanical stage) where the camera device is mounted. Accordingly, the orientation of the camera device or a relative position of the camera device is adjusted in the opposite direction to the displacement. In one or more embodiments, the control signal is sent to the camera device holder using a communication link between the camera device and the camera device holder. In one or more embodiments, the control signal includes a rotating control signal and a tilting control signal for controlling one or more rotation motors and a tilting motor, respectively of the camera device holder. Using the control signal, a geometrical behavior of the camera device holder is adjusted. In one or more embodiments, the geometrical behavior corresponds to rotating, tilting, sliding, or other motion of one or more components of the camera device holder. In one or more embodiments, adjusting the geometrical behavior of the camera device holder includes activating, using the rotating control signal, one or more rotating motors of the camera device holder, and activating, using the tilting control signal, a tilting motor of the camera device holder. In one or more embodiments where a previous orientation of the camera device is used as the target orientation, the target orientation is updated using a current orientation of the camera device after adjustment using the control signal.

In Step 1228, a substantial alignment between the target position and the light source is detected within the FOV of the auxiliary imaging element. In particular, the substantial alignment is a result of adjusting the orientation of the camera device or a relative position of the camera device in the opposite direction to the displacement.

In Step 1229, in response to detecting the substantial alignment, an image of the scene is captured by the camera device. In one or more embodiments, consecutive images are continuously captured and outputted by the camera device at a regular repetition rate (i.e., camera frame rate).

In Step 1230, a determination is made as to whether image capturing by the camera device is to continue. If the determination is positive, i.e., the image capturing is to continue, the method returns to Step 1222. If the is negative, i.e., the image capturing is not to continue, the method ends.

FIGS. 3.1, 3.2, 3.3, 3.4, 3.5, 4, 5, and 6 show various examples in accordance with one or more embodiments of the invention. The examples shown in FIGS. 3.1-6 may be, for example, based on one or more components depicted in FIGS. 1.1 and 1.2 above and the method flowcharts depicted in FIGS. 2.1 and 2.2 above. In one or more embodiments, one or more of the modules and elements shown in FIGS. 3.1-6 may be omitted, repeated, and/or substituted. Accordingly, embodiments of the invention should not be considered limited to the specific arrangements of modules shown in FIGS. 3.1-6.

FIG. 3.1 shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In particular, the camera lens (220) is associated with the imaging element A (111) to provide image focusing function. In one or more embodiments of the invention, the camera mobile device handheld grip (800) is an electro-mechanical assembly that includes a holder (221), a tilting shaft (203), a tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the stabilization controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the stabilization controller (120) via the communication interface. Similarly, the tilting shaft (203) is rotatable by the tilting motor (213) around a tilting axis (203-1) in response to the control signal received from the stabilization controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220). Although the example shown in FIG. 3.1 is based on two motors associated with two mechanical shafts, other examples may be based on three motors associated with three mechanical shafts without departing from the scope of the invention wherein the third motor may be an additional rotating motor, such as the additional rotating motor (331) with the additional rotating axis (209-2) shown in FIG. 3.3 below. Specifically, FIG. 3.3 shows a camera mobile device handheld grip (800) with three motors as an example of the camera device holder (130) depicted in FIG. 1.1 above.

FIG. 3.2 shows an example of stabilizing the camera mobile device handheld grip (800) depicted in FIG. 3.1 above. For example, the orientation of the camera mobile device (201) is stabilized when the camera mobile device handheld grip (800) is changed from the handheld position A (321) to the handheld position B (322) or changed from the handheld position B (322) to the handheld position A (321). As shown in FIG. 3.2, the handheld position A (321) corresponds to a vertical orientation (i.e., along the earth gravity direction) of the handheld grip (222). In the handheld position A (321), the tilting motor (213) maintains the camera mobile device (201) pointing toward the earth horizon (i.e., orthogonal to the earth gravity direction). In other words, the imaging plane of the camera mobile device (201) is orthogonal to the earth horizon.

The handheld position B (322) corresponds to a tilted orientation (i.e., deviating from the earth gravity direction) of the handheld grip (222). For example, the tilting motion (323) of the handheld grip (222) is exerted by the user's hand. In the handheld position B (322), the tilting motor (213) maintains the camera mobile device (201) pointing toward the earth horizon as in the handheld position A (321).

FIG. 3.4 shows a front view example of rigidly coupling the auxiliary imaging element and the camera mobile device handheld grip (800) depicted in FIGS. 3.1-3.3 above. As shown in FIG. 3.4, the auxiliary imaging element B (112) is integrated with the stabilization controller (120), which is rigidly coupled with the holder (221) of the camera mobile device handheld grip (800). Accordingly, the auxiliary imaging element B (112) is rigidly coupled with the camera lens (220) and associated imaging element A (111). FIG. 3.5 shows a rear view of the example depicted in FIG. 3.4.

Figure 4:
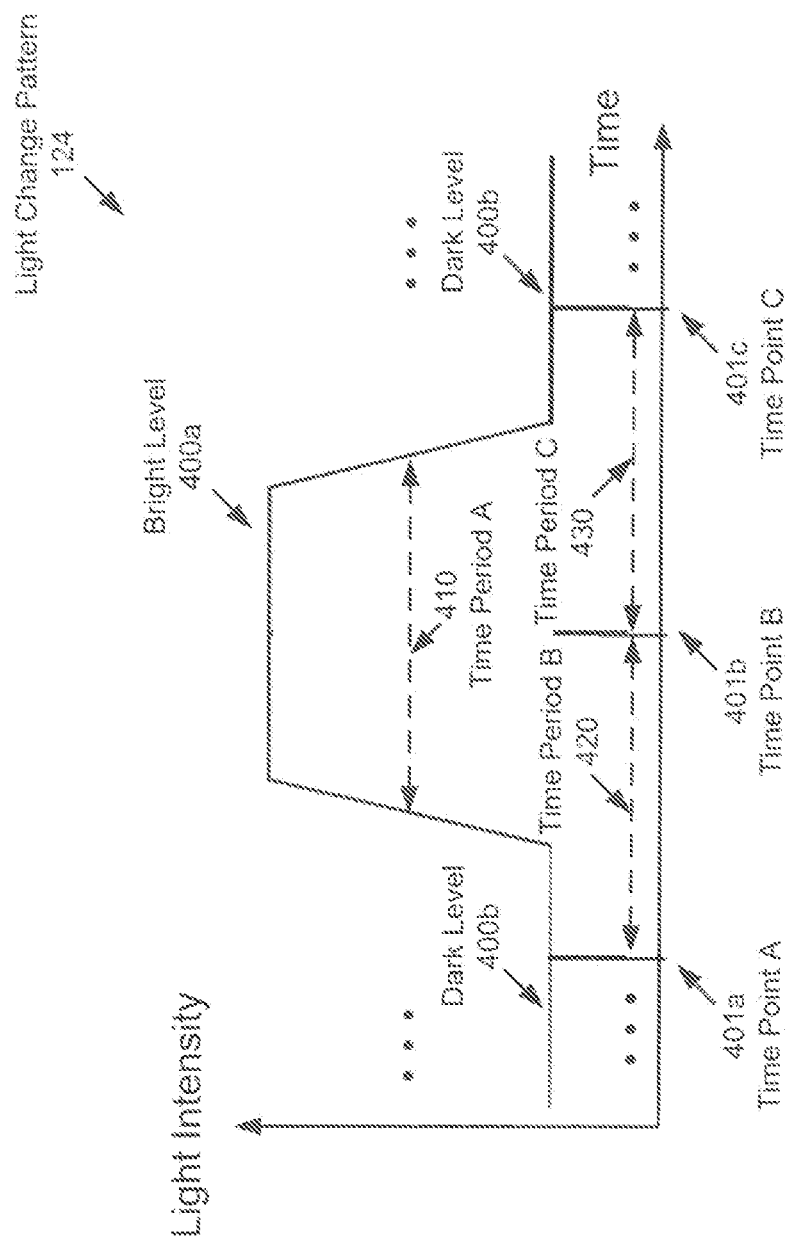

FIG. 4 shows an example of the light change pattern (124) of the light source (143) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a bright level (400a) and a dark level (400b) over time. For example, the bright level (400a) of the light intensity sustains over a time period A (410) and may be recurring over time with certain repetition rate. While the light intensity alternates between the bright level (400a) and the dark level (400b) over time, a sequence of auxiliary images is captured by the auxiliary imaging element periodically. For example, consecutive images in the sequence may be captured at a time point A (401a), time point B (401b), time point C (401c), etc. that are separated from each other by a time period B (420), time period C (430), etc. In particular, the time period A (410) encompasses at least one image capture time point, such as the time point B (401b). Although the light change pattern (124) depicted in FIG. 4 is a pattern of light intensity changes, the light change pattern (124) may also include color changes in other examples. In other words, the bright level (400a) and dark level (400b) may be substituted or supplemented by different colors to represent color changes.

Figure 5:
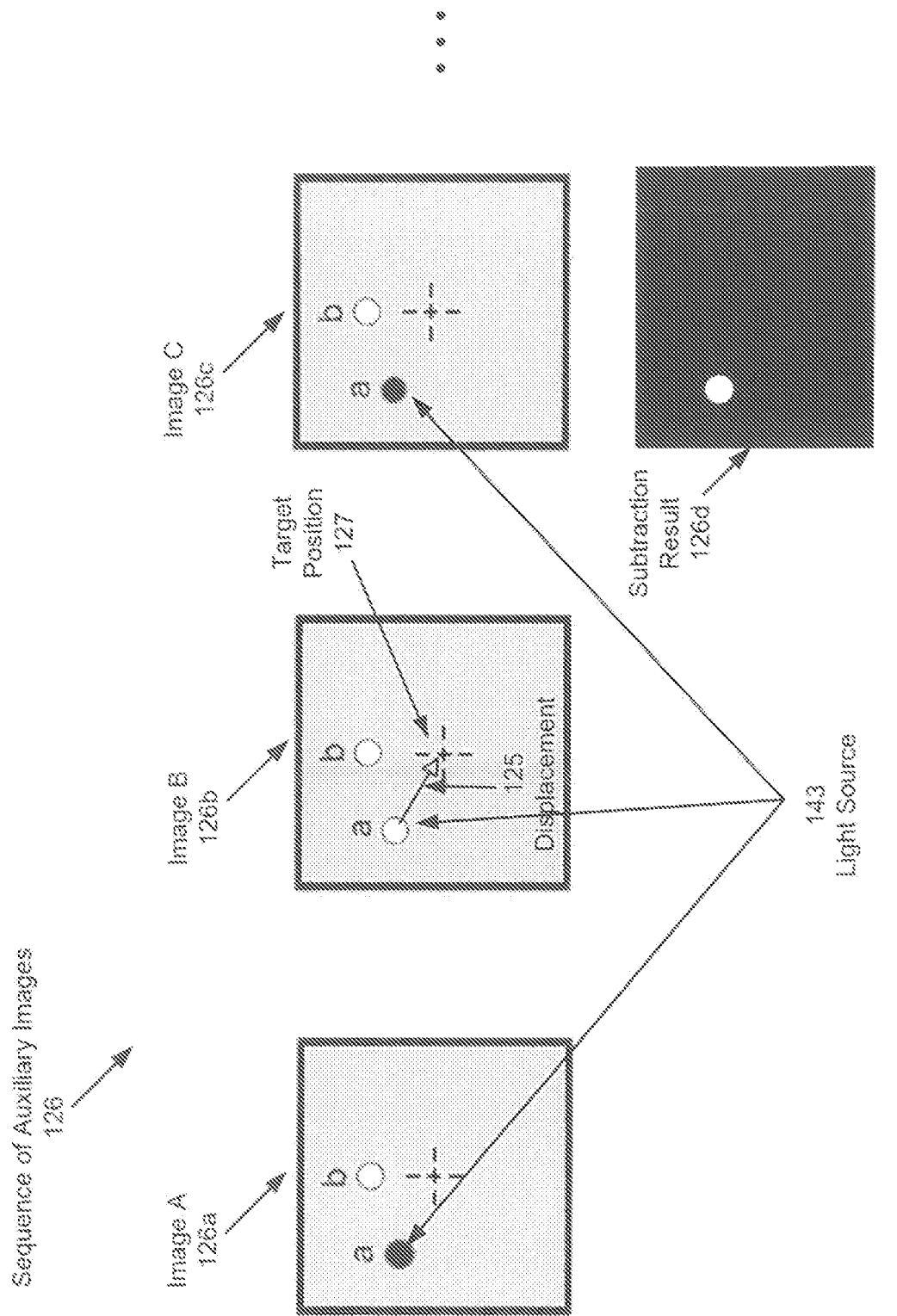

FIG. 5 shows an example of the sequence of auxiliary images (126) of the scene (140) depicted in FIGS. 1.1 and 1.2 above. As shown in FIG. 5, the sequence of auxiliary images (126) includes the image A (126a), image B (126b), image C (126c), etc. that are captured at the time point A (401a), time point B (401b), time point C (401c), etc. depicted in FIG. 4 above. According to the example of the light change pattern (124) described in reference to FIG. 4 above, the light source (143) appears as an alternating dark and bright spot at a location marked "a" in the image A (126a), image B (126b), image C (126c), etc. In contrast, the light intensity remains substantially constant at another location marked "b" in the image A (126a), image B (126b), image C (126c), etc. For example, the location marked "a" may be determined by subtracting intensity values of corresponding pixels in the image A (126a) and image B (126b) to generate the subtraction result (126d). Similarly, the location marked "a" may be further determined by subtracting intensity values of corresponding pixels in the image B (126b) and image C (126c) to generate the subtraction result (126d). In the subtraction result (126d), black color indicates no difference and white color indicates a non-zero difference. Accordingly, the location of the light source corresponds to the white spot in the subtraction result (126d).

Further as shown in FIG. 5, the center of each image is defined as the target position (127). Accordingly, the distance from the location marked "a" to the target position (127) corresponds to the displacement (125). The location marked "a", the target position (127), and the displacement (125) shown in FIG. 5 are examples of the location A (126b), target position (127), and displacement (125), respectively, depicted in FIG. 1.2 above. In one or more embodiments, the location marked "a" varies between the image A (126a), image B (126b), image C (126c), etc. The rate of change of the location marked "a" across image A (126a), image B (126b), image C (126c), etc. corresponds to the controlled movement parameter (125b) depicted in FIG. 1.2 above. In one or more embodiments, the displacement (125) and the controlled movement parameter (125b) are measured based on image pixels.

Figure 6:
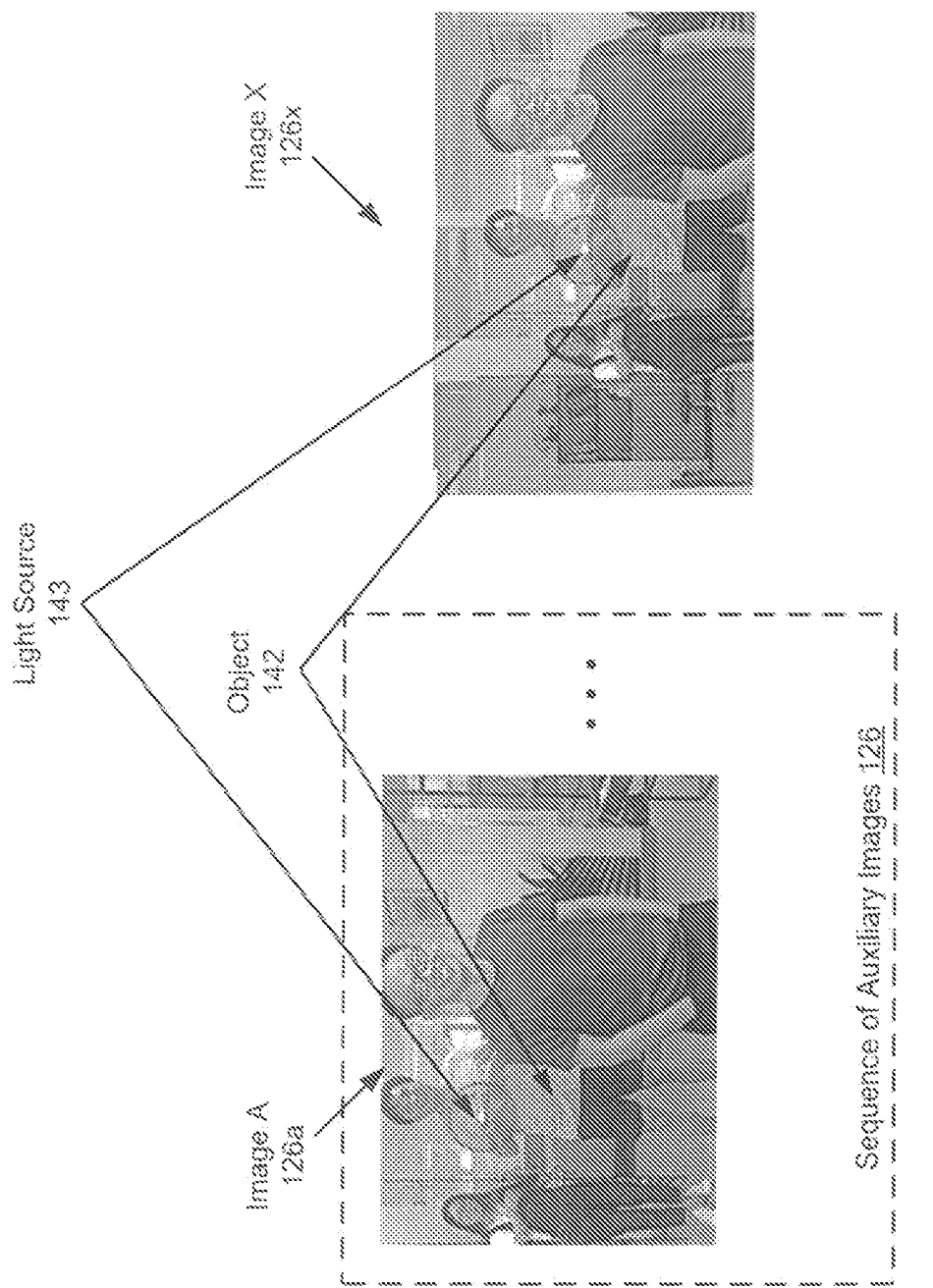

FIG. 6 shows an example of stabilizing or object tracking of a camera device based on the sequence of auxiliary images (126) described in reference to FIG. 4 above. In an example scenario, the target position is the center of the image. As shown in FIG. 6, the light source (143) is identified at a location in the left portion of the images (e.g., image A (126a)) in the sequence of auxiliary images (126). In particular, the light source (143) is held by both hands of a male person (i.e., object (142)). For example, the location of the light source (143) is identified based on the alternating dark and bright spot in the image A (126a), image B (126b), image C (126c), etc. depicted in FIG. 5 above. In other words, the light source (143) corresponds to the location marked "a" in the image A (126a), image B (126b), image C (126c), etc. depicted in FIG. 5. Because the target position (i.e., image center) is to the right of the light source location, the object stabilization controller (120) is configured to orient the camera device (110) toward the left such that the male person (i.e., object (142)) holding the light source (143) appears in the center of the image. Accordingly, the orientation of the camera device (110) is adjusted based on the identified location "a" of the light source (143) such that the object (142) appears in the center of the image X (126x), which is captured by the imaging element of the camera device.

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method to stabilize image capture for a camera device, comprising:

capturing, at an auxiliary frame rate and using an auxiliary imaging element rigidly coupled with the camera device, a plurality of auxiliary images of a light source attached to an object, wherein the auxiliary frame rate exceeds a camera frame rate of the image capture;

detecting each of a plurality of locations of the light source in a corresponding one of the plurality of auxiliary images;

analyzing, by a hardware processor, the plurality of locations to generate a measure of uncontrolled movement; and adjusting, based at least on the measure of uncontrolled movement, the camera device during the image capture of the object by the camera device at the camera frame rate.

2. The method of claim 1,
wherein the measure of uncontrolled movement represents a deviation from a predicted trajectory of the object across the plurality of auxiliary images.

3. The method of claim 2, wherein analyzing the plurality of locations comprises:
determining the predicted trajectory by at least applying a curve fitting algorithm to the plurality of locations.

4. The method of claim 3, further comprising:
analyzing the plurality of locations to generate a measure of controlled movement,
wherein the measure of controlled movement represents the predicted trajectory of the object across the plurality of auxiliary images.

5. The method of claim 4, further comprising:
mitigating, based on the measure of controlled movement, a rolling shutter effect of the image capture.

6. The method of claim 4, further comprising:
generating, based on the measure of uncontrolled movement and the measure of controlled movement, a control signal,
wherein the control signal adjusts, during the image capture, a field-of-view of the camera device to perform at least one selected from a group consisting of image stabilization based on the uncontrolled movement and object tracking based on the controlled movement.

7. The method of claim 6, further comprising:
sending, during the image capture, the control signal to a camera device holder holding the camera device, wherein the control signal comprises at least one selected from a group consisting of a rotating control signal, a tilting control signal, and an additional rotating control signal, wherein adjusting the field-of-view of the camera device comprises at least one selected from a group consisting of:
activating, using the rotating control signal, a rotating motor of the camera device holder;
activating, using the tilting control signal, a tilting motor of the camera device holder; and
activating, using the additional rotating control signal, an additional rotating motor of the camera device holder.

8. A stabilized camera device holder for stabilizing image capture, comprising:
a computer processor and memory storing instructions, when executed, causing the computer processor to:
receive, from an auxiliary imaging element rigidly coupled with a camera device, a plurality of auxiliary images of a light source attached to an object, wherein the plurality of auxiliary images are captured by the auxiliary imaging element at an auxiliary frame rate that exceeds a camera frame rate of the image capture;

detect each of a plurality of locations of the light source in a corresponding one of the plurality of auxiliary images; and
analyze the plurality of locations to generate a measure of uncontrolled movement; and
at least one motor configured to:
adjust, based at least on the measure of uncontrolled movement, the camera device during the image capture of the object by the camera device at the camera frame rate.

9. The stabilized camera device holder of claim 8, the instructions, when executed, further causing the computer processor to:
wherein the measure of uncontrolled movement represents a deviation from a predicted trajectory of the object across the plurality of auxiliary images.

10. The stabilized camera device holder of claim 9, wherein analyzing the plurality of locations comprises:
determining the predicted trajectory by at least applying a curve fitting algorithm to the plurality of locations.

11. The stabilized camera device holder of claim 10, the instructions, when executed, further causing the computer processor to:
analyze the plurality of locations to generate a measure of controlled movement,
wherein the measure of controlled movement represents the predicted trajectory of the object across the plurality of auxiliary images.

12. The stabilized camera device holder of claim 11, the instructions, when executed, further causing the computer processor to:
mitigate, based on the measure of controlled movement, a rolling shutter effect of the image capture.

13. The stabilized camera device holder of claim 11, the instructions, when executed, further causing the computer processor to:
generate, based on the measure of uncontrolled movement and the measure of controlled movement, a control signal,
wherein the control signal causes the at least one motor to adjust, during the image capture, a field-of-view of the camera device to perform at least one selected from a group consisting of image stabilization based on the uncontrolled movement and object tracking based on the controlled movement.

14. The stabilized camera device holder of claim 13,
wherein the control signal comprises at least one selected from a group consisting of a rotating control signal, a tilting control signal, and an additional rotating control signal,
wherein adjusting the field-of-view of the camera device comprises at least one selected from a group consisting of:
activating, using the rotating control signal, a rotating motor of the camera device holder;
activating, using the tilting control signal, a tilting motor of the camera device holder; and
activating, using the additional rotating control signal, an additional rotating motor of the camera device holder.

15. The stabilized camera device holder of claim 8,
wherein the auxiliary imaging element is integrated with at least one selected from a group consisting of the stabilized camera device holder and the camera device as a single device.

16. The stabilized camera device holder of claim 8,
wherein the auxiliary frame rate is between 6 times to 10 times of the camera frame rate.

17. A stabilization controller device for stabilizing image capture, comprising:
a computer processor; and
memory storing instructions, when executed, causing the computer processor to:
receive, from an auxiliary imaging element rigidly coupled with a camera device, a plurality of auxiliary images of a light source attached to an object, wherein the plurality of auxiliary images are captured by the auxiliary imaging element at an auxiliary frame rate that exceeds a camera frame rate of the image capture;
detect each of a plurality of locations of the light source in a corresponding one of the plurality of auxiliary images;
analyze the plurality of locations to generate a measure of uncontrolled movement; and
adjust, based at least on the measure of uncontrolled movement, the camera device during the image capture of the object by the camera device at the camera frame rate.

18. The stabilization controller device of claim 17,
wherein the measure of uncontrolled movement represents a deviation from a predicted trajectory of the object across the plurality of auxiliary images.

19. The stabilization controller device of claim 18, wherein analyzing the plurality of locations comprises:
determining the predicted trajectory by at least applying a curve fitting algorithm to the plurality of locations.

20. The stabilization controller device of claim 17, the instructions, when executed, further causing the computer processor to:
analyze the plurality of locations to generate a measure of controlled movement,
wherein the measure of controlled movement represents the predicted trajectory of the object across the plurality of auxiliary images.

21. The stabilization controller device of claim 20, the instructions, when executed, further causing the computer processor to:
mitigate, based on the measure of controlled movement, a rolling shutter effect of the image capture.

22. The stabilization controller device of claim 20, the instructions, when executed, further causing the computer processor to:
generate, based on the measure of uncontrolled movement and the measure of controlled movement, a control signal,
wherein the control signal causes a camera device holder of the camera device to adjust, during the image capture, a field-of-view of the camera device to perform at least one selected from a group consisting of image stabilization based on the uncontrolled movement and object tracking based on the controlled movement.

23. The stabilization controller device of claim 22,
wherein the control signal comprises at least one selected from a group consisting of a rotating control signal, a tilting control signal, and an additional rotating control signal,
wherein adjusting the field-of-view of the camera device comprises at least one selected from a group consisting of:
activating, using the rotating control signal, a rotating motor of the camera device holder;
activating, using the tilting control signal, a tilting motor of the camera device holder; and
activating, using the additional rotating control signal, an additional rotating motor of the camera device holder.

24. The stabilization controller device of claim 17,
wherein the auxiliary imaging element is integrated with at least one selected from a group consisting of the stabilization controller device and the camera device as a single device.

25. The stabilization controller device of claim 17,
wherein the auxiliary frame rate is between 6 times to 10 times of the camera frame rate.

26. A non-transitory computer readable medium storing instructions for stabilizing image capture for a camera device, the instructions, when executed by a computer processor, comprising functionality for:
capturing, at an auxiliary frame rate and using an auxiliary imaging element rigidly coupled with the camera device, a plurality of auxiliary images of a light source attached to an object, wherein the auxiliary frame rate exceeds a camera frame rate of the image capture;
detecting each of a plurality of locations of the light source in a corresponding one of the plurality of auxiliary images;
analyzing the plurality of locations to generate a measure of uncontrolled movement; and
adjusting, based at least on the measure of uncontrolled movement, the camera device during the image capture of the object by the camera device at the camera frame rate.

27. The non-transitory computer readable medium of claim 26,
wherein the measure of uncontrolled movement represents a deviation from a predicted trajectory of the object across the plurality of auxiliary images.

28. The non-transitory computer readable medium of claim 27, wherein analyzing the plurality of locations comprises:
determining the predicted trajectory by at least applying a curve fitting algorithm to the plurality of locations.

29. The non-transitory computer readable medium of claim 26, the instructions, when executed by the computer processor, further comprising functionality for:
analyzing the plurality of locations to generate a measure of controlled movement,
wherein the measure of controlled movement represents the predicted trajectory of the object across the plurality of auxiliary images.

30. The non-transitory computer readable medium of claim 29, the instructions, when executed by the computer processor, further comprising functionality for:
mitigating, based on the measure of controlled movement, a rolling shutter effect of the image capture.

31. The non-transitory computer readable medium of claim 29, the instructions, when executed by the computer processor, further comprising functionality for:
generating, based on the measure of uncontrolled movement and the measure of controlled movement, a control signal,
wherein the control signal adjusts, during the image capture, a field-of-view of the camera device to perform at least one selected from a group consisting of image stabilization based on the uncontrolled movement and object tracking based on the controlled movement.

* * * * *